Oct. 11, 1938.     F. ELLINGER     2,132,609

WATER REPLENISHING UTENSIL COVER

Filed April 29, 1937

INVENTOR.
Flora Ellinger,
BY Morsell, Lieber & Morsell
ATTORNEYS.

Patented Oct. 11, 1938

2,132,609

UNITED STATES PATENT OFFICE 2,132,609

WATER REPLENISHING UTENSIL COVER

Flora Ellinger, Milwaukee, Wis.

Application April 29, 1937, Serial No. 139,678

1 Claim. (Cl. 53—1)

This invention relates to improvements in utensil covers, and more particularly to a water replenishing utensil cover.

In the culinary art numerous foods are boiled or stewed in a certain amount of water in a utensil over an open flame. During the cooking process, if the cook is not watchful and alert, it often happens that much or all of the water in the utensil is ultimately lost by vaporization or by being boiled or the utensil may be scorched and burned to an extent to seriously impair its value. To guard against these contingencies, the present practice requires watchfulness on the part of the cook and the adding of additional supplies of water to the utensil from time to time when the water level in the utensil becomes too low.

With the above difficulties in mind, it is, therefore, a primary object of the present invention to provide a water containing utensil cover which will automatically discharge water at a predetermined rate into a cooking utensil on which it is mounted so as to replenish water in the utensil which may be lost by vaporization or through other causes, during cooking operations.

A further object of the invention is to provide a water replenishing utensil cover having a valve controlled discharge orifice arranged with means for accurately regulating the rate of discharge through said orifice.

A further object of the invention is to provide a water replenishing utensil cover which will fit on open utensils of various sizes and shapes.

A further object of the invention is to provide a water replenishing utensil cover wherein the bottom wall, adjacent the discharge orifice, is formed so as to insure the flow of water toward and through the discharge orifice notwithstanding the fact that only a small amount of water may be present in the cover member.

A further object of the invention is to provide a water replenishing utensil cover having a valve stem controlling the discharge orifice valve, which valve stem is provided with a handle which permits ready manual manipulation of the valve and also serves as a convenient means for engaging or carrying the entire utensil cover.

A further object of the invention is to provide a water replenishing utensil cover which requires no attention after the original filling and valve setting operation, which is strong and durable, which is inexpensive to manufacture, and which is well adapted for the purposes set forth.

With the above and other objects in view, the invention consists of the improved water replenishing utensil cover, and its parts and combinations as set forth in the claim, and all equivalents thereof.

In the accompanying drawing in which the same reference characters indicate the same parts in the various views.

Figure 1:
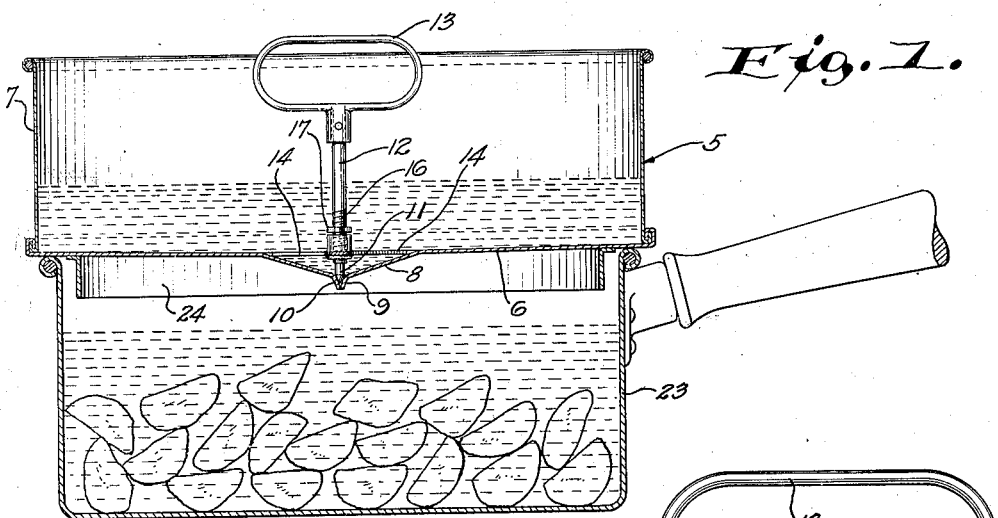
Fig. 1 is a vertical sectional view through the improved water replenishing utensil cover and an open cooking utensil on which it is set.

Referring now more particularly to the drawing, it will appear that the improved water replenishing utensil cover is an open vessel indicated generally by the numeral 5, and having a bottom 6 whose peripheral portion has connected thereto an upstanding annular side wall 7.

The bottom 6 of the member 5 is tapered slightly downwardly toward a central area 8, which central area is additionally tapered to provide a pocket or funnel. At the apex of said funnel portion 8 there is a tapered boss 9 surrounding a tapered discharge orifice 10 which is controlled by a needle valve 11 formed integral with the lower end portion of an upwardly projecting valve stem 12. The upper end of the valve stem 12 has fast thereon an enlarged looped handle member 13, and said handle member may be utilized to turn the valve stem and needle valve, or it may be grasped for the purpose of removing or carrying the cover member 5.

The funnel-shaped portion 8 of the bottom 6 is spanned by a plurality of radial struts 14 which support at their inner ends a valve stem bearing boss 15. Said boss 15 has a vertical internally threaded bore which is engaged by fast screw threads 16 on the lower portion of the valve stem 12.

Figure 2:
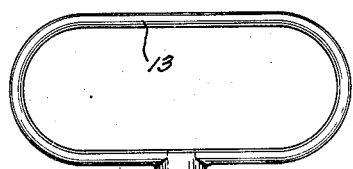
Fig. 2 is a plan view of the utensil cover.
Figure 2:
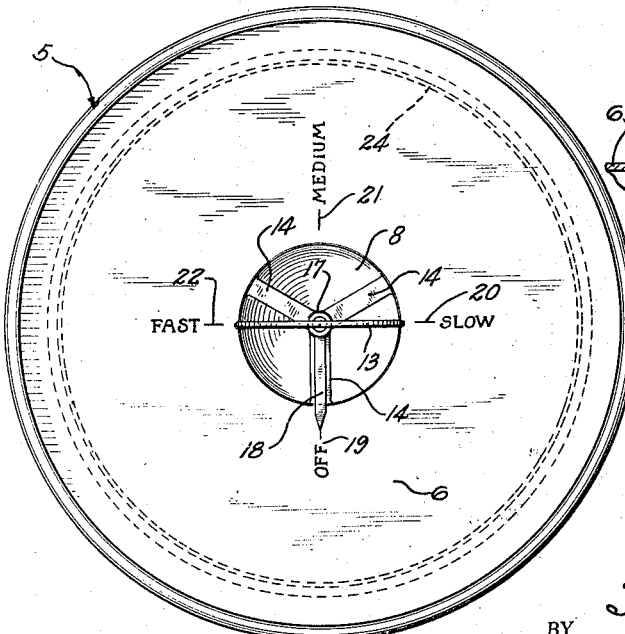
Figure 3:
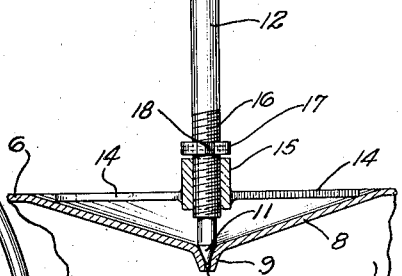
Fig. 3 is an enlarged fragmentary detailed sectional view showing the discharge orifice in the bottom wall of the utensil cover together with the controlling valve therefore.

Above the bearing boss 15, the valve stem 12 has fast thereon a collar 17 which has secured thereto the inner end portion of a radially projecting indicator hand 18. Outwardly of the funneled portion 8 of the bottom 6 there are graduations marked on the face of said bottom, preferably at ninety-degree angles to indicate various valve positions relative to the extent of openings of the discharge orifice 10. As shown in Fig. 2, there is an "off-graduation" 19 and continuing in a counter clockwise direction therefrom, at ninety-degree positions, there is a slow discharge indication 20, then a medium discharge indication 21, and finally a fast discharge indication 22.

As shown best in Fig. 1, the improved water replenishing utensil cover is adapted for use with an open cooking utensil 23. The cooking utensil or vessel 23 contains the food which is to be boiled, stewed or otherwise prepared, and said food is immersed in an initially suitable quantity of water within the vessel 23. The vessel is positioned over an open flame, gas burner or hot plate in the usual manner, and during the cooking process, as the water within the vessel 23 becomes heated and boils, some of the water will be lost by evaporation or steam. It can be accurately determined the amount of water which a given vessel will lose during a predetermined period, during cooking operations, and this amount of water or more should, therefore, be initially deposited into the cover member 5 and said cover member is then positioned on the upper peripheral portions of the vessel 23 so as to form a cover or lid therefor. The cover member 5 is of a sufficient size so that it will conveniently fit cooking vessels within a required size range. The cook, by experience, can determine the desired rate of discharge from the cover member 5 into the cooking vessel 23 and will therefore, turn the handle 13 so as to position the indicator 18 over either the slow or the medium or the fast graduation on the bottom 6. This movement of the handle will serve to turn the needle valve 11 to a position so as to open the discharge orifice 10 to a desired extent. Hence, during the cooking operation, water which is lost from the vessel 23, will be continuously and properly replenished by the drippage or flow of water from the cover member 5 through the discharge orifice 10 into the vessel 23. This will, therefore, overcome any possibility of burning out the cooking vessel 23 or burning the food therein due to a lack of a sufficient supply of water within the cooking vessel.

Projecting from the outer face of the bottom 6 of the cover member 5 and spaced inwardly from the outer margin thereof a suitable distance, there is an annular flange or collar 24. This flange is of a height or depth greater than that of the funneled portion 8 and therefore provides an even base on which the entire cover member 5 may be stationed when it is removed from the vessel 23 and placed on a table or support. The enlarged handle member 13 provides a convenient means for grasping and carrying the cover 5.

As heretofore explained, the rate of discharge of water from the cover member 5 may readily be controlled by a simple manual manipulation of the handle so as to turn the needle valve 11 to a desired selected position. It is also obvious that when the indicator is turned, to the "off position", the valve 11 will seat tightly within the discharge orifice 10, closing the same.

From the foregoing description, it will be seen that the improved water replenishing utensil cover is of simple and novel construction, is convenient to use, automatically supplies water to or replenishes water in a cooking vessel with which it is cooperating, and is well adapted for the purposes set forth.

What is claimed as the invention is:—

A water replenishing utensil cover, comprising a vessel adapted to contain water and having a flat bottom with a small central portion thereof formed as a funnel with a liquid discharge orifice in said portion, an adjustable valve controlling said orifice, graduations on said vessel flat bottom adjacent the orifice to indicate valve positions, and an indicator associated with the valve and movable over the bottom to cooperate with said graduations.

FLORA ELLINGER.